(No Model.) 2 Sheets—Sheet 1.

C. W. SALADEE.
SADDLE FOR CYCLES.

No. 475,613. Patented May 24, 1892.

Witnesses
Wm. N. N. Knight
H. F. Bernhard

Inventor
Cyrus W. Saladee
By his Attorneys
Edson Bros.

(No Model.) 2 Sheets—Sheet 2.

C. W. SALADEE.
SADDLE FOR CYCLES.

No. 475,613. Patented May 24, 1892.

Witnesses:
J. B. McGirr
N. F. Bernhard

Inventor:
Cyrus W. Saladee
By his Attorneys,
Edson Bros.

UNITED STATES PATENT OFFICE.

CYRUS W. SALADEE, OF CLEVELAND, OHIO, ASSIGNOR TO JOHN W. HENNEY, OF FREEPORT, ILLINOIS.

SADDLE FOR CYCLES.

SPECIFICATION forming part of Letters Patent No. 475,613, dated May 24, 1892.

Application filed January 11, 1892. Serial No. 417,652. (No model.)

*To all whom it may concern:*

Be it known that I, CYRUS W. SALADEE, a citizen of the United States, residing at Cleveland, in the county of Cuyahoga and State of Ohio, have invented certain new and useful Improvements in Saddles for Cycle-Vehicles; and I do hereby declare the following to be a full, clear, and exact description of the invention, such as will enable others skilled in the art to which it appertains to make and use the same.

The nature of the present invention consists of a spring for the saddle of cycle-vehicles which shall combine within itself an automatic adjustment to the weight of a light or heavy rider and a downward or rearward motion of the seat or saddle-top when the same is depressed, whereby I am enabled to secure increased resiliency to the seat or saddle-top and obviate undue strain and breakage of the parts of the spring.

The invention consists in a spring having its two rear members so curved or arranged relatively to each other as to secure between themselves or the faces of said members an automatic yielding movement under the weight of a rider, whether the weight be light or heavy.

The invention further consists in the peculiar construction, combination, and arrangement of parts, as will be hereinafter fully described, and pointed out in the claims.

In the accompanying drawings I have illustrated several modified constructions of the saddle-spring, in which drawings similar letters and figures of reference denote corresponding parts in all the figures.

Figure 1:
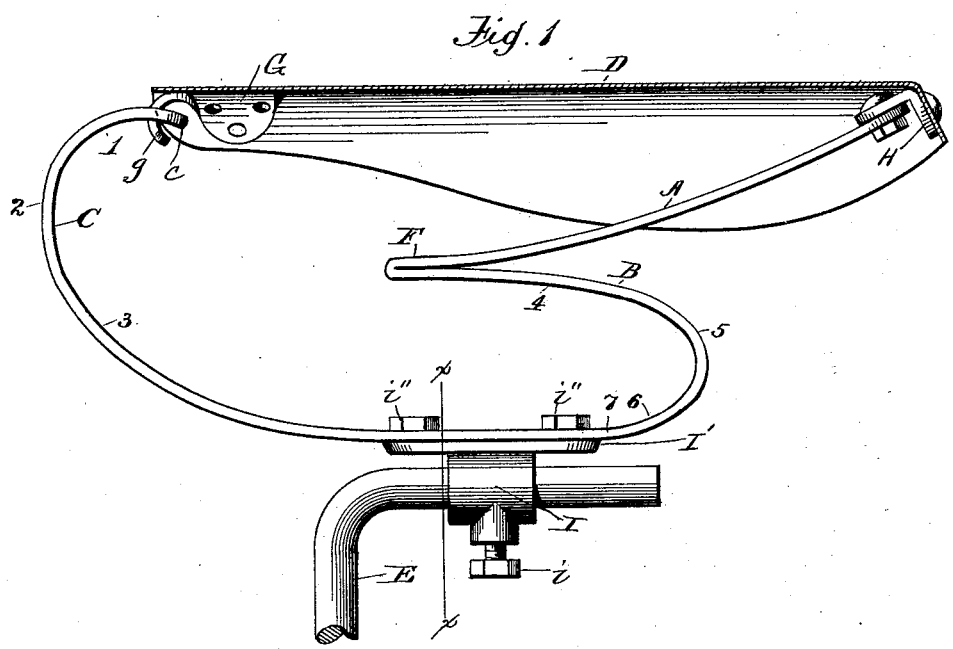
Figure 2:
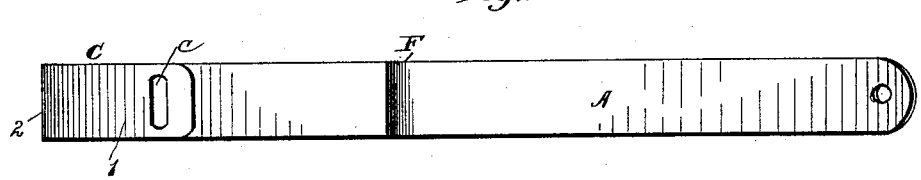
Figure 3:
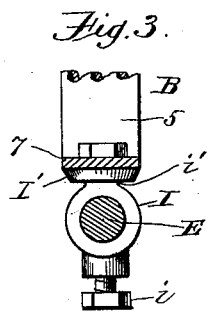
Figure 4:
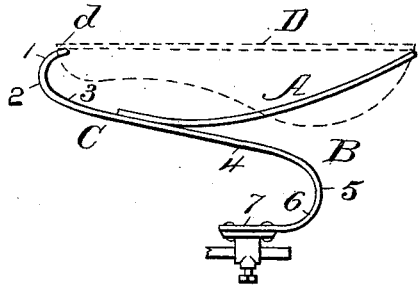
Figure 5:
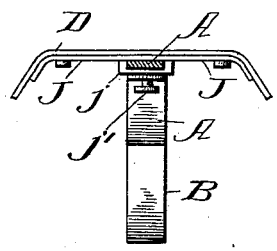
Figure 6:
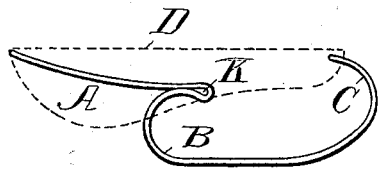
Figure 7:
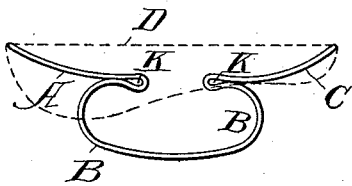

Figure 1 is a side elevation of the spring, with the saddle-top and seat-frame in section to more clearly indicate the manner of connecting the terminal ends of the saddle-top and the terminal ends of the spring. Fig. 2 is a detail of the forward member of the spring, illustrating the transverse slot therein for the reception of the pommel-hook. Fig. 3 is a sectional view on the plane indicated by the line $x\ x$ of Fig. 1, showing one form of bearing or clamp for securing the saddle-spring to the saddle-post. Fig. 4 is a side elevation of another form of saddle-spring, which, however, embodies the essential features of my invention; and Fig. 5 is a rear view of the saddle shown in Fig. 4, illustrating more clearly the manner of connecting the terminal end of the rear upper member of the spring to the saddle-top. Figs. 6 and 7 are side elevations of other forms of springs for saddles of cycle-vehicles, in which are embraced the novel features of my invention.

The spring consists, essentially, of three parts or members A, B, and C, of which A and B constitute the rear part of the spring and C the front part of the same. The members of the spring are so arranged that they mutually contribute to produce a downward and rearward motion of the saddle-top D when pressure or weight is applied thereto or exerted thereon and the rear members A B are disposed relatively to each other, so as to effect an automatic adjustment between their meeting or contacting faces under the weight of a light or heavy rider; but the specific arrangement of said members A B C to effect these results can be accomplished in different ways of bending or forming the parts or members of said spring that I do not wish to be understood as confining myself to any detailed specific construction of the spring.

In my improved saddle the top or seat D is suspended or supported from its pommel and rear end between the terminal ends or extremities of the spring or from the terminals of the members A C of the spring, and said members A C are so arranged that they mutually contribute to effect a downward and rearward motion of the seat or top D when the downward pressure is exerted thereon. The front member C of the spring extends or is curved forward beyond the pommel $d$ of the saddle, as indicated by the curve or bend 1. From thence said spring is curved or bent downward at 2, and thence the spring is curved rearward and downward at 3 to the point where it joins either of the two rear members A or B of the spring. The rear member A of the spring is curved downward and forward from its point of connection with or attachment to the rear end of the seat or top D, the forward extremity of said member A terminating at a point between the ends of the seat or top about the middle of the latter, and the rear member B extends rearwardly and downwardly at 4 from its point of juncture with the rear member A, and thence is curved downward and rearward at 5 in rear of its point of attachment of the saddle-post E and is then bent or recurved upon itself at 6 and extended forward to form a horizontal arm 7, adapted for attachment to the bearing or clamp of the saddle-post E. The rear member A of the spring is situated above the other rear member B of said spring, the two rear members being arranged in substantially the same vertical plane, and the connected ends of said members occupy such relative positions to each other that the contiguous or adjacent faces thereof are out of contact when the spring is in its normal condition or free from the weight of the rider. When the rider occupies the seat, the members of the spring are compressed to an extent proportionate to the weight imposed upon the seat or saddle, and if a heavy rider occupies the seat the members A B of the spring are compressed to a greater extent than when a lighter rider is seated on the saddle, the connected ends of the members A B being forced into contact along their contiguous faces. The upper member A of the spring thus has a bearing on the lower member B of said spring, and as the connected ends of the two members are reversely curved away from the central line Z Z drawn between the members the extent of the contact or bearing of the upper member on the lower member varies in proportion to the weight of the rider on the seat or top of the saddle.

It will be seen from the foregoing description, taken in connection with the drawings, that the reversely-curved connected rear members of the spring are adapted to automatically adjust themselves to the weight of the rider and that the peculiar curvature of the front member C of the spring assists the downward and rearward movement of the spring when weight is imposed on the saddle, thus contributing to the easy movement of the saddle.

I will now proceed to describe specifically the construction of the various forms of springs shown in the drawings, and beginning with Figs. 1, 2, and 3 the spring is preferably made of or bent from a single piece of flat metal in the form therein shown. The members A B are bent or turned abruptly at the meeting or connected ends to form the joint F; but the curvature of said members is such that the adjacent faces or bearings are practically out of contact with the spring in normal condition from a point a short distance in rear of the joint. The upper extremity of the forward member C of the spring has a transverse oblong slot $c$, and in this slot is fitted the downwardly-curved hook $g$, which is rigid with the curved or bent plate G, that is riveted to the pommel of the saddle seat or top on the lower side of the same. The rear end of the upper rear member A of the spring is attached to the hind end of the saddle-top in any suitable way, and in Fig. 1 I show said rear end riveted or bolted to the frame H, rigidly fastened to the rear extremity of the saddle top or seat.

The spring is attached or fastened to the saddle-post E by means of a suitable clamp, one form of which is shown in Figs. 1 and 3 of the drawings. This clamp has a sleeve I, which is fitted around the horizontal arm of the L-shaped post E and is clamped rigidly thereto by means of a clamping or set screw $i$, working in a vertical threaded boss on the lower side of the sleeve, and on the upper side of the sleeve I is a rigid horizontal plate I', on which rests or bears the horizontal arm 7 of the lower rear member B of the spring, said spring-arm 7 and the plate I' being rigidly fastened or connected by means of bolts $i'$, which pass through the plate and the spring-arm and receive bolts $i''$, as clearly shown.

In lieu of making the several members of the spring in one and the same piece of metal, I may make the spring in two or more parts, and in Fig. 4 of the drawings I have illustrated a spring in which the upper rear member is made separate from the lower rear member B and the front member C, and said spring is connected to the saddle in a novel manner, as shown in Fig. 5.

The spring shown in Fig. 4 embodies the same general construction and has the same characteristics as the spring shown in Fig. 1 and heretofore specifically described—i. e., consisting of the forward and downward curved front member C and the reversely-curved members A B, adapted to have bearing one upon the other and provide for an automatic adjustment for the weight of the rider; but in this form of my spring the front and lower rear members C B are made of one piece of steel, which is curved forward and downward to form the front member and then continued rearward and recurved upon itself to form the lower rear member B, having its forwardly-extended lower arm 7, adapted for attachment to the saddle-port by means of the clamp or bearing I, as shown. The upper rear member A is curved forward and downward from its point of connection with the rear end of the saddle-top, and the lower forward end of said rear upper member A is riveted, bolted, or otherwise rigidly fastened to the members B C at or about the points where said members are joined or merged into each other.

In this form of my saddle I provide the flexible or pliable saddle-top D with a rigid metallic frame J, which extends around the rear portion of the top or seat on the lower side thereof and is firmly secured to the top in any desirable manner. This frame reinforces the pliable top or seat, and it also provides for the convenient attachment of the rear end of the upper member A to the saddle, as said frame has a central loop or socket $j$, in which is fitted the rear end of the member A, said member being secured by means of a set-screw j'. The rigid frame is further provided with loops, which are adapted to receive the straps or loops for the attachment of the saddle-bag usually carried in rear of the saddle and adapted to contain tools or implements useful to the rider while on the road.

In the form and arrangement of the members A B shown in Fig. 1 of the drawings the metal is bent abruptly at the joint F, which may in some respects be objectionable, as such abrupt bending tends to fracture and weaken the metal both in the process of bending and in the use of the spring in the saddle. To obviate this defect, I propose to provide the open joint K between the rear members A B of the spring, as shown in Figs. 6, 7, and 8 of the drawings. In this form of spring the two rear members are made in one piece with each other and the front member, and in the process of bending the metal it is formed or shaped around a cylindrical or tubular mandrel at the points where the members A B are recurved or recede, so that the open circular joint K is made possible. By thus forming or manipulating the metal I am enabled to avoid fracture of the metal in the process of making the spring and in the practical use of the spring in the saddle of a cycle-vehicle.

In Fig. 7 of the drawings I show a still further modification of the spring in which the front and rear members A C are of the same form or shape, and the lower member B is connected to said upper members A C in a manner to provide the joints K K and to afford bearings for both upper members along the plane indicated by the line Z Z of the drawings.

Although I have shown and described the spring as made in one or more pieces from a flat piece of spring-steel, yet I do not restrict myself to the use of steel made flat or rectangular in cross-section. In fact, my invention contemplates making the spring of either round or flat spring metal, and when round rods or bars are used to make the spring I prefer to flatten the rods at the point K, where the bend occurs, in order to secure the desired bearing between the upper and lower rear members of the spring.

Instead of using only a single continuous spring, I may make the spring of two or more light rods of sufficient strength to stand the strain, and said rods are arranged parallel with each other and are bent to either of the forms herein shown and described, as contemplated by my invention.

I am aware that further changes in the form and proportion of parts and details of construction can be made without departing from the spirit or sacrificing the advantages of my invention, and I therefore reserve the right to make such changes and alterations as fairly fall within the limits of my invention.

Having thus fully described my invention, what I claim as new, and desire to secure by Letters Patent, is—

1. In a saddle for cycle-vehicles, a spring adapted to support the seat or top suspended at its opposite ends from the terminals of said spring, the latter consisting of the flection members A B C, the two rear members A B being so curved and arranged as to insure an automatic adjustment between their forward portions, thereby adjusting said spring to the weight of the rider and affording a downward and rearward movement to the rear end of the saddle, as set forth.

2. In a saddle for cycle-vehicles, a spring having the reversely-curved rear members arranged relatively to each other to secure an automatic adjustment between themselves under the stress or weight of the load on the saddle seat or top, as and for the purpose described.

3. In a saddle for cycle-vehicles, a spring having its front and rear members arranged to be connected to opposite ends of the saddle seat or top, and the lower member curved reversely to said upper member and affording a bearing for the upper rear member and securing an automatic adjustment between the upper and lower rear members, as and for the purpose set forth.

4. In a saddle for cycle-vehicles, a spring adapted to suspend the saddle-seat from its ends and between the terminal ends of such spring, comprising the downwardly-curved member A, extended forward from the hind end of the seat to a point between the ends of the same, the member B, curved reversely to said member A and extended rearward and downward to afford a bearing therefor, said lower member B being thence extended forward to the clamp of the saddle-post, and the forward and downward curved member C, extended beyond the pommel of the seat and joined to the rear member of either of them, as and for the purpose described.

5. In a saddle for cycle-vehicles, a spring adapted to suspend the saddle-seat from its ends between the terminal ends of said spring, having its rear members A B curved in reverse planes to afford a bearing for one another, and the meeting ends of said members connected by an open joint, as and for the purpose described.

6. In a saddle for cycle-vehicles, a spring comprising the front member C and the rear members A B, said rear members having their meeting ends joined by the open joint K, which lies below the seat and in proximity to its vertical axis, the member A being curved rearward and upward from said joint and the member B curved rearward and downward from the joint and thence extended forward to the saddle-post, as and for the purpose described.

7. In a saddle for cycle-vehicles, a spring bent from a single piece of metal to form the member A, which curves forward and downward from the saddle-seat, thence carried rearward and downward beneath the member A, forming the member B, thence reversed and extended forward beyond the saddle-post, and finally turned upward and rearward at C to connect with the pommel of the saddle, as set forth.

8. A spring for cycle-vehicles, having the front member C made in one piece with one of the rear members, and said rear members urved reversely and arranged one below the other to afford a bearing and secure an automatic adjustment between said rear members, as and for the purpose described.

In testimony whereof I affix my signature in presence of two witnesses.

CYRUS W. SALADEE.

Witnesses:
C. D. RILY,
E. F. HARRINGTON.